United States Patent
Worek

(10) Patent No.: US 9,036,372 B2
(45) Date of Patent: May 19, 2015

(54) METHOD FOR CONTROLLING A RESONANT-MODE POWER SUPPLY AND A RESONANT-MODE POWER SUPPLY WITH A CONTROLLER

(75) Inventor: Cezary Worek, Cracow (PL)

(73) Assignee: AKADEMIA GORNICZO-HUTNICZA IM. STANISLAWA STASZICA W KRAKOWIE, Cracow (PL)

( * ) Notice: Subject to any disclaimer, the term of this patent is extended or adjusted under 35 U.S.C. 154(b) by 0 days.

(21) Appl. No.: 14/123,526

(22) PCT Filed: Jul. 23, 2012

(86) PCT No.: PCT/EP2012/064379
§ 371 (c)(1),
(2), (4) Date: Dec. 22, 2013

(87) PCT Pub. No.: WO2013/017450
PCT Pub. Date: Feb. 7, 2013

(65) Prior Publication Data
US 2014/0146574 A1 May 29, 2014

(30) Foreign Application Priority Data
Aug. 2, 2011 (PL) .......................................... 395844

(51) Int. Cl.
*H02M 3/335* (2006.01)
*H02M 3/337* (2006.01)
(Continued)

(52) U.S. Cl.
CPC .. *H02M 3/33507* (2013.01); *H02M 2007/4818* (2013.01); *H02M 3/33553* (2013.01);
(Continued)

(58) Field of Classification Search
CPC ............. H02M 2001/0058; H02M 2007/4815; H02M 7/523; H02M 3/33523
USPC ....................................................... 363/16–17
See application file for complete search history.

(56) References Cited

U.S. PATENT DOCUMENTS

| | | | |
|---|---|---|---|
| 6,151,231 | A | 11/2000 | Saint-Pierre |
| 2003/0231514 | A1 | 12/2003 | Croulard et al. |

(Continued)

FOREIGN PATENT DOCUMENTS

| | | | |
|---|---|---|---|
| PL | 349476 | A2 | 3/2003 |
| PL | 389886 | A1 | 6/2011 |

*Primary Examiner* — Harry Behm
(74) *Attorney, Agent, or Firm* — Mark M. Friedman

(57) ABSTRACT

A method for controlling a resonant-mode power supply, the resonant-mode power supply comprising an assembly of switches (K1, K2, K3, K4), between which a resonant circuit with an output load is connected, and a controller (C) configured to stabilize output voltages or currents by controlling switching frequency of the assembly of switches (K1, K2, K3, K4) in response to the output of a slow-response monitoring circuit (SMC) configured to monitor the output voltage or current and having a certain time ($\tau 1$) of response to changes of value of the output voltage or current. The power supply further comprises an energy recirculation circuit (ERC1) in which the current (Ilim) is monitored by means of a fast-response monitoring circuit (CMC1) having a time ($\tau 2$) of response to changes in the (Ilim) current faster than the response time ($\tau 1$) of the slow-response monitoring circuit (SMC). The method involves adjusting, via the controller (C), the switching frequency of the assembly of switches (K1, K2, K3, K4) such as to reduce the power supplied to the resonant circuit upon exceeding a threshold value by the current (Ilim).

9 Claims, 6 Drawing Sheets

(51) Int. Cl.
  *H02M 7/48* (2006.01)
  *H02M 1/00* (2006.01)
(52) U.S. Cl.
  CPC .... *H02M3/3376* (2013.01); *H02M 2001/0032* (2013.01); *Y02B 70/1433* (2013.01); *Y02B 70/16* (2013.01); *H02M 2001/0058* (2013.01); *Y02B 70/1491* (2013.01)

(56) References Cited

U.S. PATENT DOCUMENTS

| | | |
|---|---|---|
| 2006/0077695 A1 | 4/2006 | Garcea et al. |
| 2006/0290295 A1* | 12/2006 | Yang et al. .................... 315/274 |
| 2009/0034298 A1 | 2/2009 | Liu et al. |
| 2010/0020569 A1 | 1/2010 | Melanson et al. |

* cited by examiner

METHOD FOR CONTROLLING A RESONANT-MODE POWER SUPPLY AND A RESONANT-MODE POWER SUPPLY WITH A CONTROLLER

TECHNICAL FIELD

The present invention relates to a method for controlling a resonant-mode soft-switched power supply and to a resonant-mode power supply with a controller intended for stabilization of the output voltage, current or power.

BACKGROUND ART

Most of resonant-mode power supplies are not capable to provide proper stabilization of voltages, currents or output power over the entire load range, i.e. from the open to shorted output. In general, any of these states, or both of them, can be regarded as the most adverse operating conditions. To remedy this problem, resonant power circuit configurations are modified by means of e.g. providing additional energy recirculation circuits that enable feeding energy from the resonant circuit back to the supply or employing advanced circuits for controlling switches.

The Polish patent application P-349476 discloses a method for the output voltage and current control in power supplies provided with circuits feeding excess energy from the resonant circuit series capacitor back to the inverter electric source (energy recirculation). The inverter has an output voltage limiter, the input of which is connected in parallel to a load, for example by means of a transformer playing also the role of the output transformer. The rectifier output of the quality-factor limiter is connected to the inverter DC power supply buses. The voltage limiter and the energy recirculation circuit operate in a mutually complementary manner, such that the energy recirculation circuit limits the resonance circuit current and, as a consequence, the excess stored energy is supplied back to the source from both the voltage limiter and the energy recirculation circuits. Since the power supply provides continuous energy recirculation to the source, the resonant circuit current waveform maintains a quasi-sinusoidal nature, even under no-load conditions, and the output DC or AC voltage magnitude is limited to the level set by the voltage limiter parameters. In another exemplary embodiment, a capacitor is connected to the power supply DC output in order to enforce quasi-sinusoidal currents in the resonant circuit. The capacitor is charged by a series of rectified sinusoidal voltage pulses until the capacitor voltage attains the switch-off level set by the input voltage divider and the reference voltage applied to the second input of the comparator under the condition that duration of the shortest pulse series equals three half-cycles of the resonant circuit self oscillations and pulse series are switched on and off at the instants in which switches' currents are approaching zero. Whereas during pauses between groups of pulses the resonant circuit is short-circuited by means of a switches adjacent to one pole of DC supply.

From the US patent application US2010/00205695 there is known a resonant converter having a system for adaptive control of dead time between pulses in order to improve the efficiency of the converter, reduce voltage and current stresses in power components and mitigate electromagnetic disturbances. A dead time between pulses generated by the switching circuit is adaptively set by a control circuit in conformity with the magnitude of the input voltage and controlled according to the current passing through the inductive element of the resonant circuit. The dead time may also be computed on the cycle-by-cycle basis from the current value or taken from a look-up table that sets the dead time in conformity with the input voltage and inductor current values.

From the US patent application US20030231514 there is known a series-parallel resonance converter and a method of operating such a converter, dedicated for high-voltage applications of the order of 100 kilovolts and more. The control circuit has two states of operation: the first state for controlling the system output parameters and the start state. In this embodiment of the invention the start of the conduction of the switches is synchronized with the value of the parallel resonant circuit current. More particularly, the start of the first conduction of one of the switches is carried out at the maximum parallel resonant circuit current and at the same polarity as in the series resonant circuit.

From the US patent application US20090034298 there is known a method for resonant-type AC-DC power supplies control with low power losses at low loading conditions and low standby power loss. The method is based on the frequency response and loading condition of the resonant circuit of a resonant converter, adjusts the switching frequency and the switching duty cycle so as to obtain a stable output voltage. The method also improves its performance employing zero voltage switching (ZVS) and output synchronous rectifiers. The resonant-type power supply controller utilizes a hybrid technique that consists in combining frequency modulation and pulse width modulation, referred to as frequency modulation hybrid pulse width modulation (FMHYPWM). The controller can also be used for power factor correction and to the output synchronous rectifier control.

Furthermore, in the Polish patent Application P-389886 there is described a method for controlling H-bridge in a resonant-type converter that consist in alternate switching of the bridge switches so that between turning-on pairs of switches: the first and third or the second and fourth, are alternately turned-on pairs of high-side switches: the first and fourth or low-side switches: the second and third.

A U.S. Pat. No. 6,151,231 discloses a series-resonant power converter featuring a tap winding on a transformer that is coupled to a resonant capacitor in a resonant tank circuit. The power converter comprises an assembly of switches, between which a resonant circuit with an output load is connected and a controller configured to stabilize the output voltages by controlling switching of the switches in response to a slow-response monitoring circuit configured to monitor the output voltage. It comprises an energy recirculation circuit, configured to clamp the voltage across the resonant capacitor when the control circuit detects light load conditions and otherwise to maintain the voltage across the resonant capacitor unaffected when the control circuit determines heavy load conditions.

Although all the above methods are useful, they do not take full advantages offered by the control utilizing self-oscillations of the resonant circuit.

The aim of the invention is to provide a method of controlling a resonant-mode soft-switched power supply capable to provide proper stabilization of the output voltage, current or power over the entire load range, i.e. from the open to shorted output.

DISCLOSURE OF THE INVENTION

The object of the present invention is a method for controlling a resonant-mode power supply, the resonant-mode power supply comprising an assembly of switches, between which a resonant circuit with an output load is connected, and a controller configured to stabilize output voltages or currents by controlling switching frequency of the assembly of switches in response to the output of a slow-response monitoring circuit configured to monitor the output voltage or current and having a certain time ($\tau 1$) of response to changes of value of the output voltage or current. The power supply further comprises an energy recirculation circuit in which the current is monitored by means of a fast-response monitoring circuit having a time ($\tau 2$) of response to changes in the current faster than the response time ($\tau 1$) of the slow-response monitoring circuit, and wherein the method involves adjusting, via the controller, the switching frequency of the assembly of switches such as to reduce the power supplied to the resonant circuit upon exceeding a threshold value by the current.

Preferably, by means of the fast-response circuit for monitoring the current of the recirculation circuit, via the controller, the switching frequency of the assembly of switches is increased.

Preferably, by means of the fast-response circuit for monitoring the current of the recirculation circuit, via the controller, the switching of the assembly of switches is turned off.

Preferably, by means of the controller at heavy output loads, exceeding the threshold value, the output voltages or currents are stabilized by way of adjusting the switching frequency of the assembly of switches employing soft switching technique, so that switches are turned-on at the negative or zero current passing through the switches, the current being monitored by a circuit for monitoring of the resonant circuit current, wherein during each period of the resonant circuit oscillations the duty factor of each switch is maintained close to 50%, and the dead time between switching is adjusted so that during said dead time the potential at switches can attain a value close to the supply buses potential; whereas at light output loads, below the threshold value, the output voltages or currents are stabilized by utilizing sequential cycle-stealing of the resonant circuit self-oscillation full cycles by way of shorting some of the switches, turning off the other switches and turning them on again at the instant when the current passing through these switches is negative or zero.

Preferably, the characteristic of the output voltage, current or power versus switching frequency is ambiguous and consist of two regions: the first region, from no-load to maximum load is characterized by a decreasing switching frequency of the switches, whereas the second region, from maximum load to short circuit is characterized by an increasing switching frequency of the switches.

The object of the invention is also a resonant-mode power supply, comprising: an assembly of switches, between which a resonant circuit with an output load is connected, and a controller configured to stabilize the output voltages or currents by controlling switching frequency of the assembly of switches in response to the output of a slow-response monitoring circuit configured to monitor the output voltage or current and having a certain time ($\tau 1$) of response to changes of of the output voltage or current. It further comprises an energy recirculation circuit in which the current is monitored by a fast-response monitoring circuit having a time ($\tau 2$) of response to changes in the current faster than the response time ($\tau 1$) of the slow-response monitoring circuit, wherein the fast-response monitoring circuit is configured to adjust, via the controller, the switching frequency of the assembly of switches such as to reduce the power supplied to the resonant circuit upon exceeding the threshold value by the current.

Preferably, the fast-response monitoring circuit is configured to increase, via the controller, the switching frequency of the assembly of switches.

Preferably, the fast-response monitoring circuit is configured to turn off, via the controller, the switching of the assembly of switches.

Preferably, the controller is configured to operate in two modes: in the first mode, at heavy output loads, exceeding the threshold value, it is adapted to stabilize output voltages or currents by way of adjusting switching frequency of the assembly of switches employing soft switching technique, so that the switches are turned-on at the negative or zero current passing through the switches, the current being monitored by a circuit for monitoring of the resonant circuit current, wherein during each period of the resonant circuit oscillations the duty factor of each switch is maintained close to 50%, and it is further adapted to operate with dead time between switching chosen so that during said dead time potential at switches could attain a value close to the supply buses potential; and in the second mode, at light output loads, below the threshold value, it is adapted to stabilize the output voltages or currents utilizing sequential cycle-stealing of the resonant circuit self-oscillation full cycles by way of shorting some of the switches, turning off the other switches and turning them on again at the instant when the current passing through these switches is negative or zero.

Preferably, the characteristic of the output voltage, current or power versus switching frequency of switches is ambiguous and consist of two regions: the first region, from no-load to maximum load is characterized by a decreasing switching frequency of switches, whereas the second region, from maximum load to short circuit is characterized by an increasing switching frequency of switches.

BRIEF DESCRIPTION OF DRAWINGS

The present invention is shown by means of exemplary embodiments on a drawing, in which.

MODES FOR CARRYING OUT THE INVENTION

Figure 1:
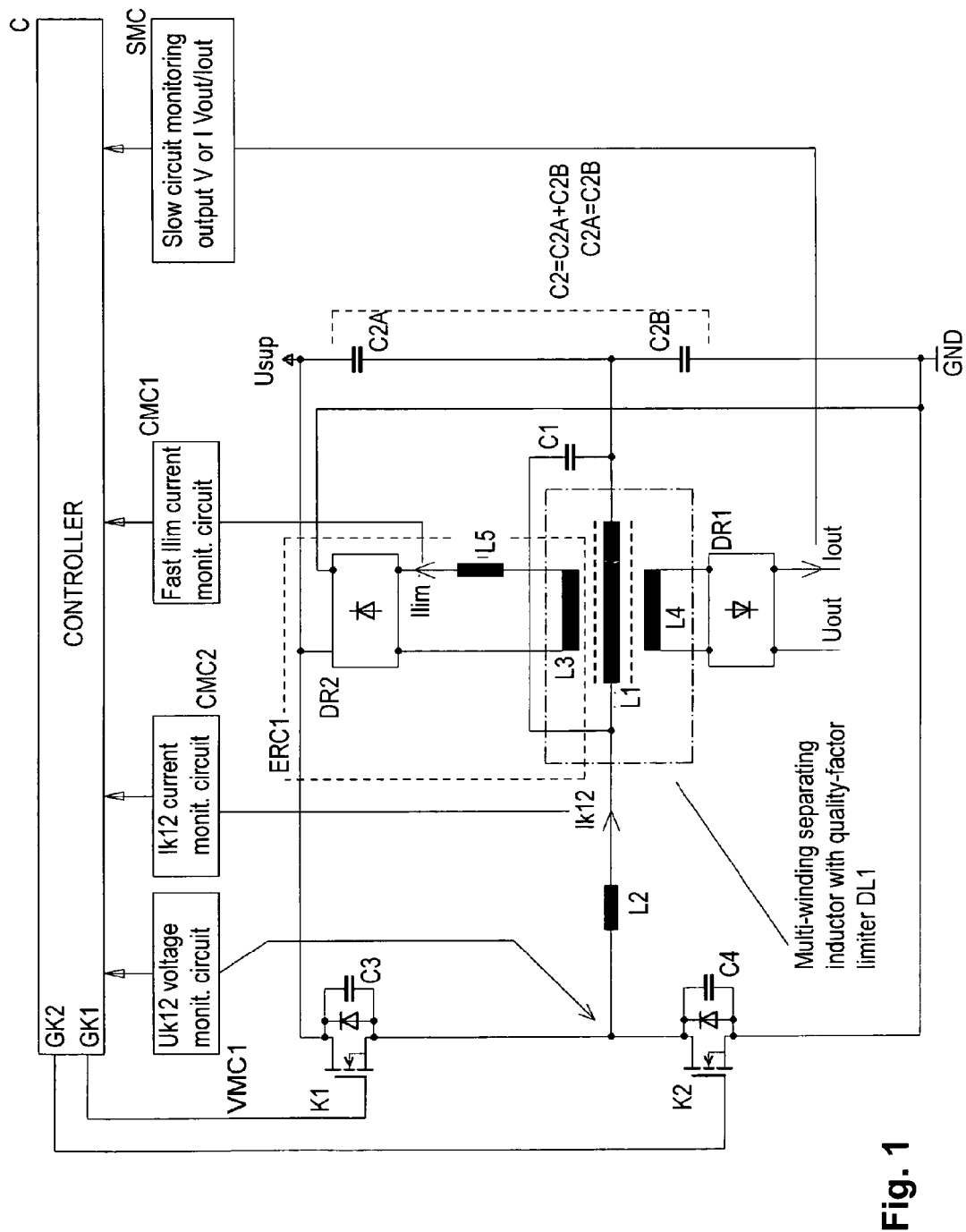
FIG. 1 shows a first exemplary embodiment of the resonant-mode power supply with a controller, as a half-bridge resonant converter with a quality-factor limiter incorporating a multi-winding inductor DL1 being also an inductive element of the power resonant circuit and to which a load is connected.

FIG. 1 shows the first exemplary embodiment of the resonant-mode power supply with a controller, as a half-bridge resonant converter with a quality-factor limiter incorporating a multi-winding inductor DL1 having a magnetic circuit which contains an air gap. The resonant-mode power supply comprises an assembly of switches K1, K2 connected into a half-bridge configuration. In the diagonal of the half-bridge there is connected a series-parallel resonant circuit comprised of inductor L2, capacitance C1, parallel connection of capacitances C2A and C2B that constitute the resultant capacitance C2, and inductor L1 being a part of the multi-winding inductor DL1 which isolates the quality-factor limiter winding L3, and the load circuit winding L4 by means of which a load is connected through a diode rectifier DR1 to the resonant-mode power supply. The inductor L2 together with the resultant capacitance C2 of the parallel-connected capacitances C2A and C2B form the series resonant circuit, whereas capacitance C1 and inductor L1, which is a part of the multi-winding inductor, form the parallel resonant circuit. The energy recirculation circuit ERC1 is formed by a strong magnetic coupling between windings of inductors L1 and L3 in the multi-winding inductor, and by the inductor L5 and rectifier DR2, and limits the resonant circuit quality-factor so that excess energy from the resonant circuit is fed back to the supply source Usup. Preferably, each of switches K1, K2 can be provided with parallel-connected reactance elements C3, C4 so that the system would operate in class DE with so-called soft switching of K1 and K2 switches. The components values are selected in such a manner that the current continuity in the resonant circuit is preserved irrespectively from the load and thereby dynamic performance of the resonant-mode power supply is substantially improved. Exemplary parameters of the embodiment of the resonant-mode power supply shown in FIG. 1 are as follows: output power=3 kW, supply voltage Usup=410V, output voltage Uout=50VDC, C1=90 nF, C2A=C2B=60 nF, C2=C2A+C2B=120 nF, C3=C4=4.7 nF, L2=30uH, L1=100uH, L3=55uH, L4=4uH, L5=1.8uH, the coupling coefficient between L1 and L3 is k=0.99, and coupling coefficient between L1 and L4 is k=0.99.

The controller (C) is adjusted to operate in within two ranges of a load, which is monitored by the output voltage and/or current monitoring circuit SMC or by other, dedicated load measuring system.

In the first operating mode, referred to as the high output power region, at heavy loads, i.e. exceeding the threshold value, the output voltages or currents are stabilized by way of adjusting switching frequency of the switch assembly K1, K2 employing soft switching technique. Switches K1, K2 are switched-on at the negative or zero current of switches K1, K2, monitored by the circuit (CMC2) for monitoring the resonance circuit current. During each period of the resonant circuit oscillations for each K1, K2 switch the duty factor is maintained close to 50% so that the dead time and turn-off time of one of the half bridge switches, or of two switches in the full-bridge diagonal, was equal to the dead time and turn-off time of the second switch of two half bridge switches or of two other switches in the full bridge diagonal. The dead time between switching is chosen so that during said dead time the potential at K1, K2 switches could attain a value close to the supply buses potential. Since characteristics of the output voltage, current or power versus switching frequency are ambiguous and consist of two regions: the first region, from no-load to maximum load is characterized by a decreasing switching frequency, whereas the second region, from maximum load to short circuit is characterized by an increasing switching frequency. The direction of changes in the switching frequency is selected based on the output power measurement or, where the output voltage is stabilized, selection of the direction of changes can be achieved by means of a simple logic circuit that stabilizes the output voltage by reducing the switching frequency when the load increases and upon exceeding maximum load current it stabilizes the load current so that the switching frequency is increased if the load resistance decreases.

The dead time between switches K1 and K2 turn-on can be selected such as to allow the potential on switches (K1, K2) attain a value close to the supply buses potential. This, however, is not an optimal solution in terms of the available power supplied to the load. Thus, optionally, the controller (C) is adapted to monitor the half bridge output voltage Uk12 by means of VMC1 circuit and, depending on the Uk12 voltage, set as short as possible dead time such that potential on switches (K1, K2) could during this dead time attain a value close to the supply buses potential.

The resonant-mode power supply contains the energy recirculation circuit ERC1 and current monitoring circuit CMC1 limiting the resonant circuit quality factor, connected through the diode rectifier DR2 to the supply voltage Usup. The ERC1 circuit provides the resonant-mode power supply circuit protection against overvoltages and overcurrents because in transient states it allows feeding back the excess energy stored in the resonant circuit to the supply source. The current monitoring circuit CMC1 is adapted to monitor the recirculation circuit current Ilim in the resonant circuit energy recirculation circuit ERC1 and, by means of the controller C, to effect a change in K1, K2 switching frequency in order to reduce power supplied to the resonance circuit upon exceeding the threshold value by the current Ilim in the energy recirculation circuit ERC1.

Preferably the current monitoring circuit CMC1 should operate fast and respond within even a half-cycle of the switches control sequence. In general, the current monitoring circuit CMC1 should be characterized by a response time ($\tau 2$) to changes in the (Ilim) current faster than the response time ($\tau 1$) of the slow-response monitoring circuit of the output voltage or current (SMC). The response time ($\tau 1$) of the slow-response monitoring circuit of the output voltage or current (SMC) depends on parameters of the output filter by means of which the SMC circuit is connected to the output, and whereof cut-off frequency is for example several hundred Hz.

The output power control is achieved by means of varying the switching frequency of K1, K2 switches or by "stealing" a certain number of cycles of the resonant circuit oscillations, i.e. turning the switches assembly off so as to limit overvoltages and overcurrents occurring in the circuit.

Figure 2:
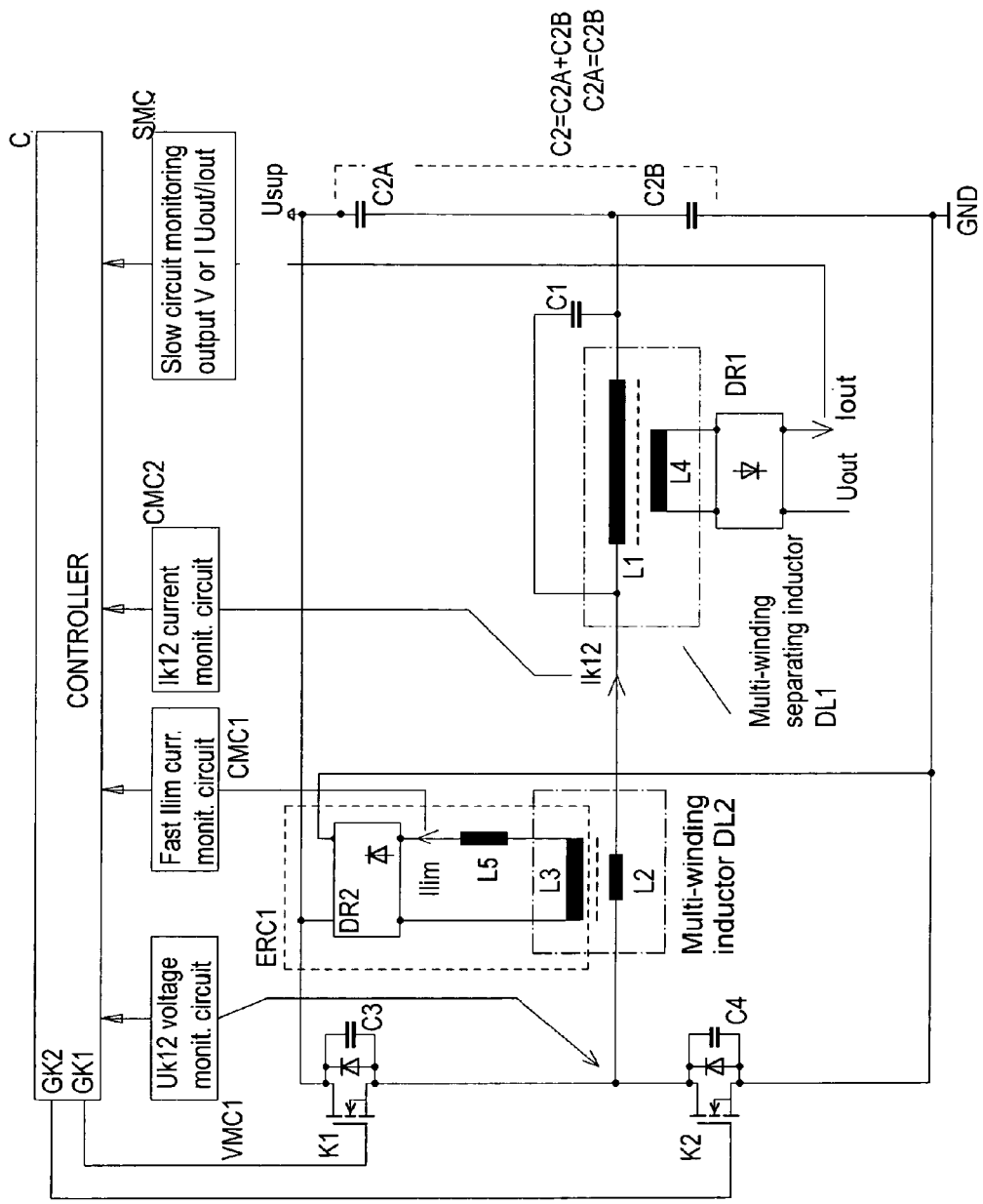
FIG. 2 shows a second exemplary embodiment of the resonant-mode power supply with a controller, as a half-bridge resonant converter incorporating a multi-winding inductor DL2 being also an inductive element of the power resonant circuit.

FIG. 2 shows another embodiment of the resonance-mode power supply with a controller, as a half-bridge resonant converter. The main difference between this embodiment and the embodiment shown in FIG. 1 consists in connecting the energy recirculation circuit ERC1 to another reactance element (L2) of the resonant circuit and simplification of the multi-winding inductor DL1 to which the load is connected.

Figure 3:
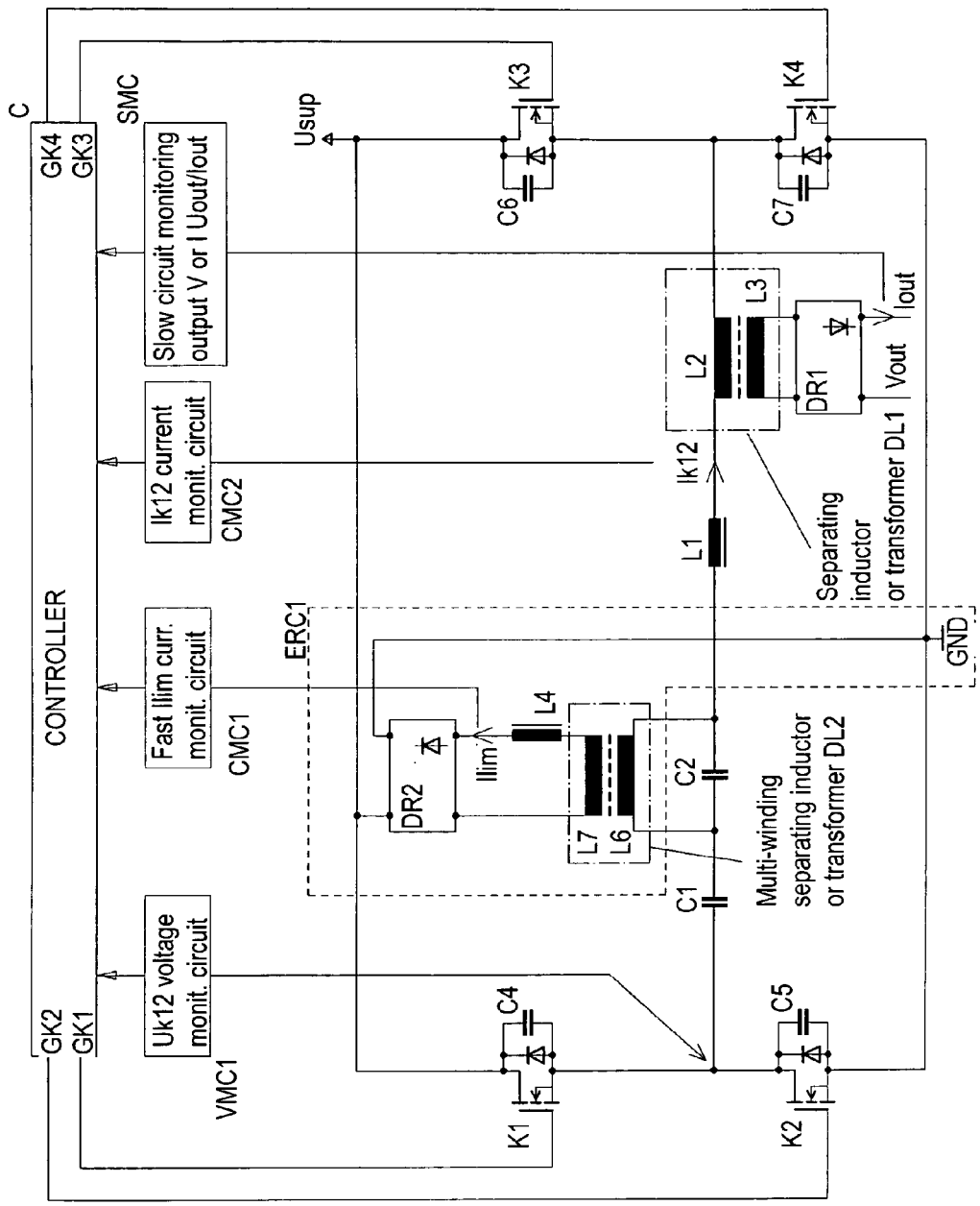
FIG. 3 shows a third exemplary embodiment of the resonant-mode power supply with a controller, as a full-bridge resonant converter incorporating the multi-winding inductor DL2 being also an inductive element of the power resonant circuit.

FIG. 3 shows a further embodiment of the resonance-mode power supply with a controller, as a full-bridge resonant converter provided with the multi-winding inductor DL1 being also an inductive element of the power resonant circuit with the energy recirculation circuit ERC1 incorporating the inductor D2. This example embodiment incorporates a series resonant circuit connected in the bridge diagonal whereof part is the multi-winding inductor DL1 by means of which a load is connected to the resonance-mode power supply whereas two pairs of switches K1, K2, K3, K4 are used.

For a person skilled in the art it will be apparent that the presented method can also be employed to resonance-mode power supplies different from aforementioned structures comprising an assembly of switches and a resonant circuit connected between them.

Figure 4:
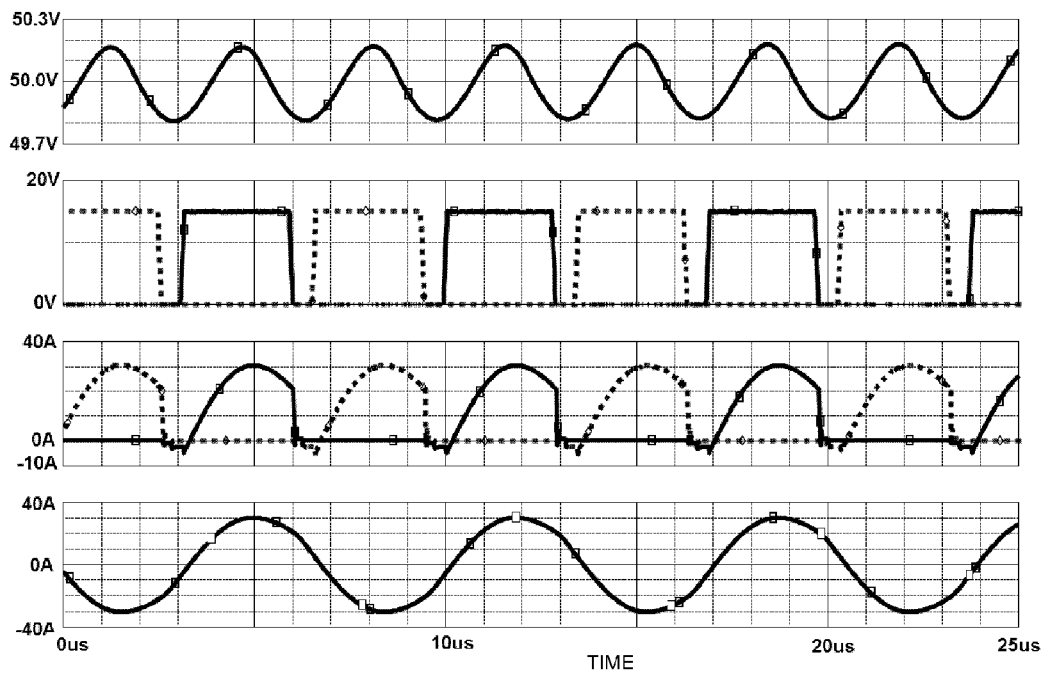
FIG. 4 shows waveforms of currents and voltages in the resonant-mode power supply at heavy loads.

FIG. 4 shows waveforms of currents and voltages in the example embodiment of FIG. 1 of the resonant-mode power supply for nominal load. The first plot from the top is the output voltage waveform. The second plot from the top represents the gate drive voltage of the high-side transistor K1 shown in solid line, and the gate drive voltage of the low-side transistor K2 shown in dashed line. The third plot from top represents the high-side transistor K1 drain current shown in solid line and the low-side transistor K2 drain current shown in dashed line. The bottom plot shows the current in the inductor L1.

In the second operating mode, referred to as the low-power region, with light output loads, i.e. below the threshold value, the output voltages or currents are stabilized employing sequential cycle-stealing of the resonant circuit self-oscillation full cycles by means of shorting a part of the switches, for example one or two of the half bridge switches or two diagonally opposite full-bridge switches and turning off other switches, i.e. the half bridge second switch o the remaining full bridge switches, and turning them on again at the instant when the current passing through these switches is negative or zero. In order to achieve this, the resonant circuit self-oscillation current Ik12 is measured by the current monitoring circuit (CMC2) during cycle-stealing of the resonant circuit self-oscillation full cycles and therefore the controller S can again turn-on the diagonally opposite switches K1 and K2 at the instant when the current passing through these switches is negative or zero.

Figure 5:
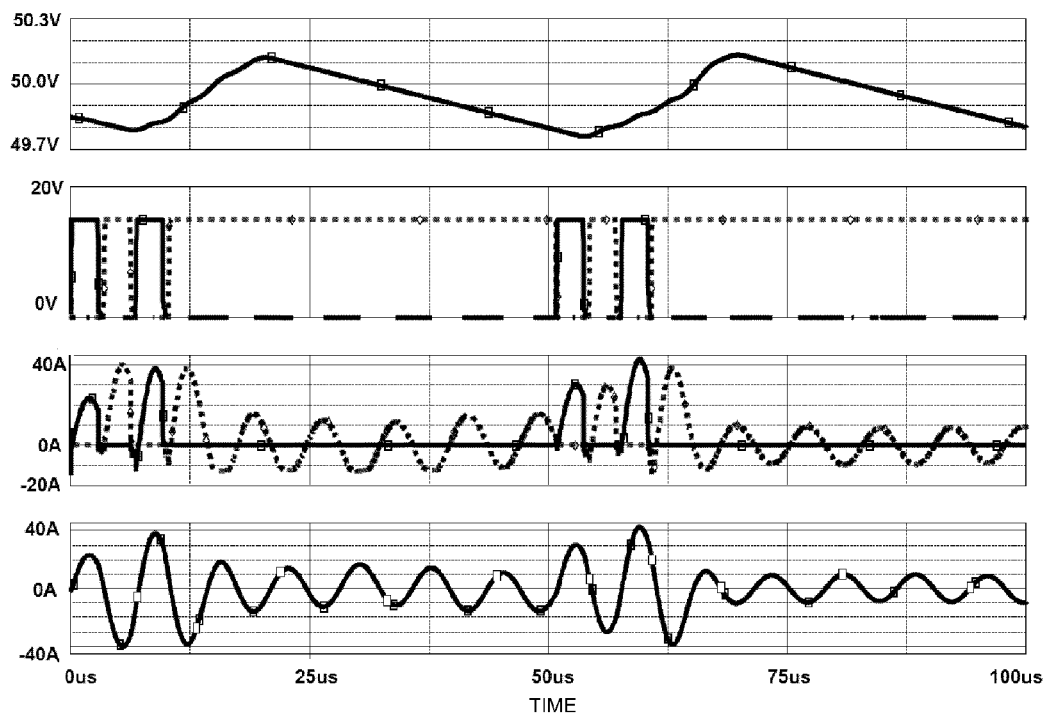
FIG. 5 shows waveforms of currents and voltages in the resonant-mode power supply at light loads.

FIG. 5 shows waveforms of currents and voltages in the resonant-mode power supply at light loads for the load resistance 3 OHM. The upper plot shows the output voltage. The second plot from top represents the gate drive voltage of the high-side transistor K1 shown in solid line, and the gate drive voltage of the low-side transistor K2 shown in dashed line. The third plot from top represents the high-side transistor K1 drain current shown in solid line and the low-side transistor K2 drain current shown in dashed line. The bottom plot shows the current in the inductor L1. The control is performed by means of sequential stealing of the resonant circuit self-oscillation full cycles in such a manner that during cycle-stealing the half bridge switch K1 is clamped to ground whereas the half bridge switch K2 is opened. The path for the resonant circuit current is therefore closed and due to high quality factor the resonant circuit maintains current circulation in its circuits, e.g. the inductor L2, over a relatively long time. When the voltage over the output capacitor/filter drops, the inverter is started again in order to supply energy to the load, however in order minimize losses and electromagnetic disturbances, the switches are turned-on at instants when the switch current is negative or zero. During a time period up to 10 us both switches are operated alternately. When the voltage across the output filter exceeds a certain set the stealing of the resonant circuit self-oscillation full cycles is employed in such a manner that during cycle-stealing the half bridge switch K2 is clamped to the power supply ground whereas the half bridge switch K1 is open. The resonant circuit oscillates with self-oscillation frequency. When the voltage across the output filter attains the set minimum value at the instant close to 52 us the switches are again alternately turned-on in order to supply energy to the load. The voltage across the output filter rises again to the set maximum value and the stealing of the resonant circuit self-oscillation full cycles is employed again in such a manner that during cycle-stealing the half bridge switch K2 is clamped to the power supply ground whereas the half bridge switch K1 is open.

Where transistor switches are used, the aforementioned switch current should be understood as the drain/collector current with the integrated anti-parallel diode.

Figure 6:
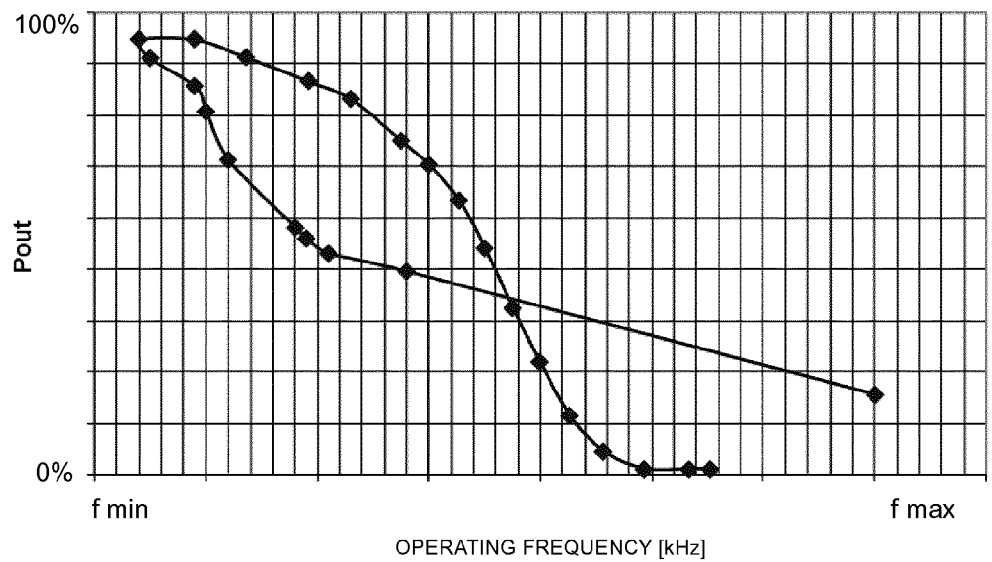
FIG. 6 shows the characteristic of output power versus switching frequency.

FIG. 6 shows the output power characteristic versus switching frequency. This characteristic is ambiguous and consist of two regions: the first region, from no-load to maximum load is characterized by reducing the frequency of switching K1, K2 switches whereas the second region, from maximum load to short circuit it is characterized by increasing the frequency of switching K1, K2 switches. Ideally, a correctly designed resonant energy-conversion system should supply nominal power to a nominal load and outside of this operating point the load power should be lower. Under such conditions, referred to as energy matching, maximum efficiency of the resonant energy-conversion system can be achieved. This additionally allows minimizing overcurrents and overvoltages occurring in the resonant energy-conversion system.

Figure 7:
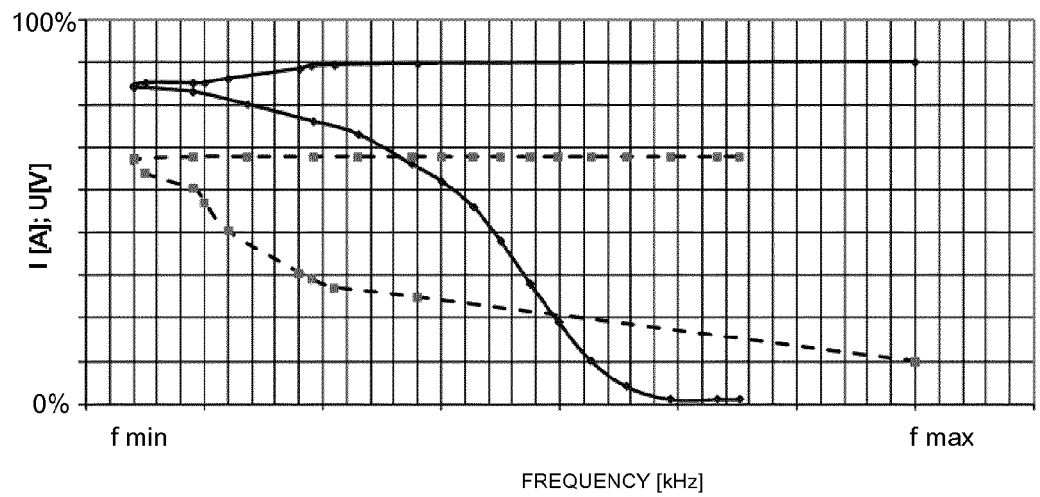
FIG. 7 shows the plots of output current and voltage versus switching frequency.

FIG. 7 shows the output current (solid line) and output voltage (dashed line) plots versus the frequency of switching K1, K2 switches.

Figure 8:
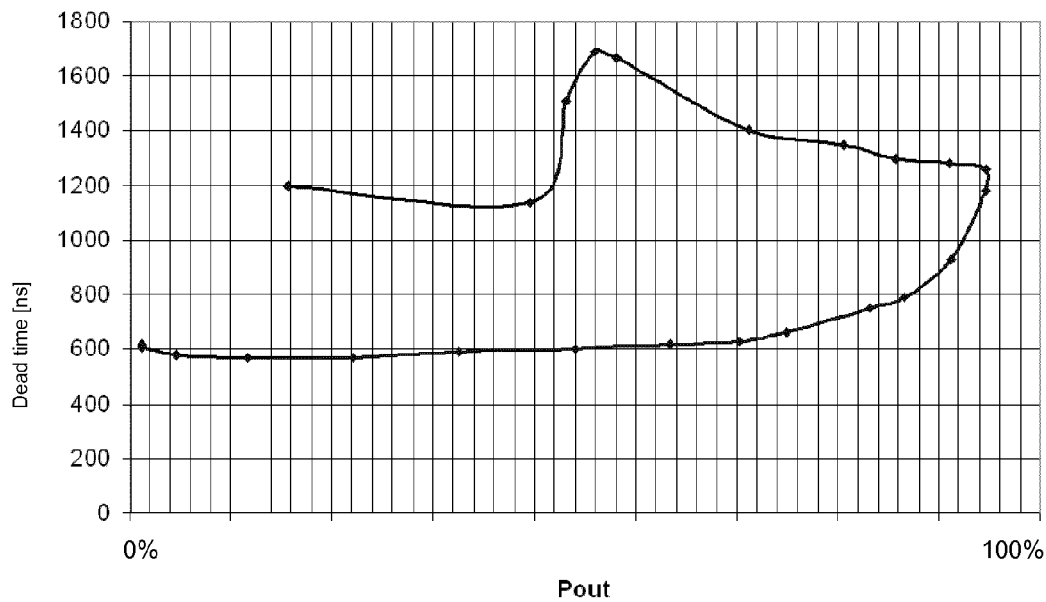
FIG. 8 shows the plot of dead time versus output power.
Figure 9:
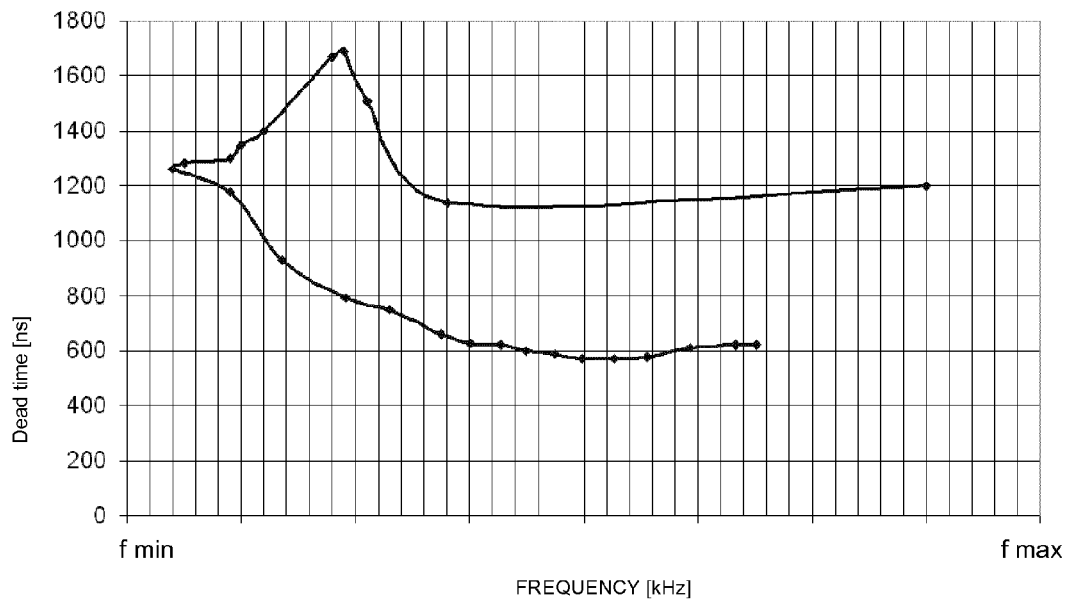
FIG. 9 shows the plot of dead time versus switching frequency.

FIG. 8 shows the dead time plot versus the output power, whereas FIG. 9 shows the dead time plot versus the frequency of switching K1, K2 switches. Since switches are provided with parallel-connected capacitors so as the system would operate in class DE with so-called soft switching, the optimum dead time depends on the resonant circuit impedance, which in turn depends chiefly on both: the switching frequency and load, and therefore it varies over a wide range. Thus in order to achieve the best parameters the voltage at the full-bridge or half bridge output should advantageously be monitored in a continuous manner and the dead time should be chosen so that during said dead time the potential at K1, K2 switches could attain a value close to the supply buses potential.

As an example, the threshold value taken to define the boundary between the high-power and low-power regions is 10% of the resonant-mode power supply permissible load. Then stabilization of the output voltage or/and current over the output power range 10%-100% of full load is achieved by means of varying the switching frequency of K1, K2 switches employing soft switching technique and its advantages are: simple system structure, energy efficiency and stability. Whereas stabilization of the output voltage or/and current over the output power range 0%-10% of full load by means of sequential cycle-stealing of the self-oscillation full cycles has the advantage that over this range it provides high efficiency and does not require significant changes in switching frequency thus the feedback loop stability can be easy achieved.

The invention claimed is:

1. A method for controlling a resonant-mode power supply, the resonant-mode power supply comprising:
   an assembly of switches (K1, K2, K3, K4) between which a resonant circuit with an output load is connected,
   a controller (C) configured to stabilize output voltages, currents or power by controlling switching frequency of the assembly of switches (K1, K2, K3, K4) in response to the output of a slow-response monitoring circuit (SMC) configured to monitor the output voltage, current or voltage and current and having a certain time ($\tau 1$) of response to changes of value of the output voltage or current,
   and an energy recirculation circuit (ERC1),
   wherein a current (Ilim) in the energy recirculation circuit (ERC1) is monitored by means of a fast-response monitoring circuit (CMC1) having a time (τ2) of response to changes in the (Ilim) current faster than the response time (τ1) of the slow-response monitoring circuit (SMC), and wherein the method involves adjusting, via the controller (C), the switching frequency of the assembly of switches (K1, K2, K3, K4) to reduce the power supplied to the resonant circuit upon exceeding a threshold value by the current (Ilim), and wherein the characteristic of the output voltage, current or power versus switching frequency is ambiguous and consist of two regions: the first region, from no-load to maximum load is characterized by a decreasing switching frequency of the switches (K1, K2, K3, K4), whereas the second region, from maximum load to short circuit is characterized by an increasing switching frequency of the switches (K1, K2, K3, K4).

2. The method according to claim 1, wherein by means of the fast-response circuit (CMC1) for monitoring the current (Ilim) of the recirculation circuit (ERC1), via the controller (C), the switching frequency of the assembly of switches (K1, K2, K3, K4) is increased.

3. The method according to claim 1, wherein by means of the fast-response circuit (CMC1) for monitoring the current (Ilim) of the recirculation circuit (ERC1), via the controller (C), the switching of the assembly of switches (K1, K2, K3, K4) is turned off.

4. The method according to claim 1, wherein means of the controller (C):
at heavy output loads, exceeding the threshold value,
the output voltages or currents are stabilized by way of adjusting the switching frequency of the assembly of switches (K1, K2, K3, K4) employing soft switching technique,
so that switches (K1, K2, K3, K4) are turned-on at the negative or zero current passing through the switches (K1, K2, K3, K4), the current being monitored by a circuit (CMC2) for monitoring of the resonant circuit current,
wherein during each period of the resonant circuit oscillations the duty factor of each switch is maintained close to 50%,
and the dead time between switching is adjusted so that during said dead time the potential at switches can attain a value close to the supply buses potential,
whereas at light output loads, below the threshold value,
the output voltages or currents are stabilized by utilizing sequential cycle-stealing of the resonant circuit self-oscillation full cycles by way of shorting some of the switches (K1, K2, K3, K4), turning off the other switches (K1, K2, K3, K4) and turning them on again at the instant when the current passing through these switches is negative or zero.

5. A resonant-mode power supply, comprising:
an assembly of switches (K1, K2, K3, K4),
between which a resonant circuit with an output load is connected,
a controller (C) configured to stabilize the output voltages, er-currents or power by controlling switching frequency of the assembly of switches (K1, K2, K3, K4) in response to the output of a slow-response monitoring circuit (SMC) configured to monitor the output voltage, current or voltage and current and having a certain time (τ1) of response to changes of value of the output voltage or current,
and an energy recirculation circuit (ERC1), wherein a current (Ilim) in the energy recirculation circuit (ERC1) is monitored by a fast-response monitoring circuit (CMC1) having a time (τ2) of response to changes in the (Ilim) current faster than the response time (τ1) of the slow-response monitoring circuit (SMC), wherein the fast-response monitoring circuit (CMC1) is configured to adjust, via the controller (C), the switching frequency of the assembly of switches (K1, K2, K3, K4) to reduce the power supplied to the resonant circuit upon exceeding the threshold value by the current (Ilim), and wherein the characteristic of the output voltage, current or power versus switching frequency is ambiguous and consist of two regions: the first region, from no-load to maximum load is characterized by a decreasing switching frequency of the switches (K1, K2, K3, K4), whereas the second region, from maximum load to short circuit is characterized by an increasing switching frequency of the switches (K1, K2, K3, K4).

6. The resonant-mode power supply according to claim 5, wherein the fast-response monitoring circuit (CMC1) is configured to increase, via the controller (C), the switching frequency of the assembly of switches (K1, K2, K3, K4).

7. The resonant-mode power supply according to claim 5, wherein the fast-response monitoring circuit (CMC1) is configured to turn off, via the controller (C), the switching of the assembly of switches (K1, K2, K3, K4).

8. The resonant-mode power supply according to claim 5, wherein the controller (C) is configured to operate in two modes:
in the first mode, at heavy output loads, exceeding the threshold value,
it is adapted to stabilize output voltages or currents by way of adjusting switching frequency of the assembly of switches (K1, K2, K3, K4) employing soft switching technique,
so that the switches (K1, K2, K3, K4) are turned-on at the negative or zero current passing through the switches (K1, K2, K3, K4), the current being monitored by a circuit (CMC2) for monitoring of the resonant circuit current,
wherein during each period of the resonant circuit oscillations the duty factor of each switch is maintained close to 50%,
and it is further adapted to operate with dead time between switching chosen so that during said dead time potential at switches (K1, K2, K3, K4) could attain a value close to the supply buses potential,
and in the second mode, at light output loads, below the threshold value,
it is adapted to stabilize the output voltages or currents utilizing sequential cycle-stealing of the resonant circuit self-oscillation full cycles by way of shorting some of the switches (K1, K2, K3, K4), turning off the other switches (10, K2, K3, K4) and turning them on again at the instant when the current passing through these switches is negative or zero.

9. A method for controlling a resonant-mode power supply, the resonant-mode power supply comprising:
an assembly of switches (K1, K2, K3, K4),
between which a resonant circuit with an output load is connected,
and a controller (C) configured to stabilize output voltages, or currents or power by controlling switching frequency of the assembly of switches (K1, K2, K3, K4) in response to the output of a slow-response monitoring circuit (SMC) configured to monitor the output voltage, current or voltage and current and having a certain time ($\tau 1$) of response to changes of value of the output voltage or current, wherein the power supply further comprises an energy recirculation circuit (ERC1) in which a current (Ilim) is monitored by means of a fast-response monitoring circuit (CMC1) having a time ($\tau 2$) of response to changes in the (Ilim) current faster than the response time ($\tau 1$) of the slow-response monitoring circuit (SMC), and wherein the method involves adjusting, via the controller (C), the switching frequency of the assembly of switches (K1, K2, K3, K4) to reduce the power supplied to the resonant circuit upon exceeding a threshold value by the current (Ilim), and wherein the characteristic of the output voltage, current or power versus switching frequency is ambiguous and consist of two regions: the first region, from no-load to maximum load is characterized by a decreasing switching frequency of the switches (K1, K2, K3, K4), whereas the second region, from maximum load to short circuit is characterized by an increasing switching frequency of the switches (K1, K2, K3, K4).

\* \* \* \* \*

UNITED STATES PATENT AND TRADEMARK OFFICE
CERTIFICATE OF CORRECTION

| | | |
|---|---|---|
| PATENT NO. | : 9,036,372 B2 | Page 1 of 1 |
| APPLICATION NO. | : 14/123526 | |
| DATED | : May 19, 2015 | |
| INVENTOR(S) | : Cezary Worek | |

It is certified that error appears in the above-identified patent and that said Letters Patent is hereby corrected as shown below:

In the claims,

Claim 5, column 9, line 60 should be corrected as follows:

Change:
-- er-currents --
to
"currents"

Claim 8, column 10, line 55 should be corrected as follows:

Change:
-- (10,K2,K3,K4) --
to
"(K2,K3,K4)"

Signed and Sealed this
Sixth Day of October, 2015

Michelle K. Lee
*Director of the United States Patent and Trademark Office*